(12) United States Patent
Jenek

(10) Patent No.: US 8,415,866 B2
(45) Date of Patent: Apr. 9, 2013

(54) LAMP MODULE, PARTICULARLY FOR SPECTRAL ANALYSIS DEVICES

(75) Inventor: Torsten Jenek, Frankfurt (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 13/440,260

(22) Filed: Apr. 5, 2012

(65) Prior Publication Data

US 2012/0274198 A1   Nov. 1, 2012

(30) Foreign Application Priority Data

Apr. 28, 2011   (DE) .......................... 10 2011 018 986

(51) Int. Cl.
*H01J 5/16* (2006.01)
(52) U.S. Cl. ........................................ 313/112; 313/111
(58) Field of Classification Search .................. 313/110, 313/111, 112
See application file for complete search history.

(56) References Cited

U.S. PATENT DOCUMENTS

| | | |
|---|---|---|
| 4,049,987 A | 9/1977 | Helms |
| 4,812,657 A | 3/1989 | Minekane |
| 4,910,431 A | 3/1990 | Witt et al. |
| 5,117,150 A | 5/1992 | Schwarz et al. |

FOREIGN PATENT DOCUMENTS

| | | |
|---|---|---|
| CN | 2861710 Y | 1/2007 |
| DE | 3902144 A1 | 8/1990 |
| EP | 1186828 A1 | 3/2002 |
| EP | 1201984 A1 | 5/2002 |

OTHER PUBLICATIONS

Search Report issued Aug. 17, 2012 in EP Application No. 12002086.2.

*Primary Examiner* — Vip Patel
(74) *Attorney, Agent, or Firm* — Panitch Schwarze Belisario & Nadel LLP

(57) ABSTRACT

A known lamp module for spectral analysis devices includes a lamp receptacle body having a cavity for receiving a deuterium lamp having a lamp bulb made of synthetic quartz glass. The cavity has a beam outlet opening closed with an optical transmission element. In order to provide a lamp module having a deuterium lamp with an ozone filter that exhibits a long service life, that can be manufactured economically, and that ensures a high intensity in a wavelength range between 190 nm and 250 nm, such a known lamp module is provided with a VUV edge filter in the beam outlet opening on the side of the optical transmission element facing the deuterium lamp.

16 Claims, 1 Drawing Sheet

LAMP MODULE, PARTICULARLY FOR SPECTRAL ANALYSIS DEVICES

BACKGROUND OF THE INVENTION

The invention relates to a lamp module, particularly for spectral analysis devices, comprising a lamp receptacle body which, for receiving a deuterium lamp having a lamp bulb made of synthetic quartz glass, has a cavity with a beam outlet opening, which is closed with an optical transmission element.

Spectral analysis devices require high optical stability in the sense of a continuous, line-free spectrum in the desired wavelength range. Deuterium lamps are preferred radiation sources for UV spectroscopy, because they emit very intense UV radiation in a range of 180 nm to approximately 400 nm. To cover a broader spectrum, a second lamp—usually a halogen lamp—having a spectrum stretching into the visible range is connected to the deuterium lamp. The spectrum of such a composite lamp module lies in the wavelength range between 180 nm and 1100 nm.

One problem in the use of deuterium lamps is the formation of ozone due to the radiation components of the deuterium plasma below 190 nm. This problem can be solved by selecting a special borosilicate glass, a so-called "UV glass," which absorbs radiation having a wavelength less than 190 nm for the lamp bulb of the deuterium lamp. The UV glass, however, does not have a steep absorption profile, but instead flattens out toward the long-wave range. Therefore, a portion of the working radiation between 190 nm and 280 nm is still absorbed in lamp bulbs and is therefore not available for spectral analysis purposes.

Another variant of deuterium lamps uses a lamp bulb made of synthetic quartz glass, which is covered completely or partially with a layer acting as an interference or absorption filter for wavelengths below 190 nm. This lamp type is defined as "ozone-free," because radiation of a wavelength that generates ozone is not emitted from the lamp bulb. However, the direct application of the ozone-suppressing filter layer on the lamp bulb is complicated and offers little clearance room with respect to the further construction of the lamp module.

Deuterium lamps without ozone filters are also on the market in which, for operation in the short-wave spectral range, ozone produced is forcibly removed to the outside or a so-called ozone absorber blocks the ozone before it is discharged into the environment.

From German published patent application DE 39 02 144 A1 a deuterium lamp having a quartz glass bulb is known. The part of the lamp bulb through which the generated radiation is transmitted is covered on its outer side with an ozone-suppressing filter. This involves an interference filter having a layered configuration, wherein the individual layers are applied by vapor deposition in high-vacuum systems. These deposition methods using thin-film technology are expensive and not of unlimited suitability, especially for the production of homogeneous layer structures on curved surfaces. In addition, the thermal loading of these filter layers directly on the surface of the lamp bulb is very high during operation, so that the filter can be damaged already during production and especially during long periods of use of these lamps.

Furthermore, from European patent application publication EP 1 186 828 A1 a deuterium lamp without an ozone filter is known. The lamp bulb is housed in a lamp receptacle body made of aluminum, which is forced air-cooled with an air flow from the rear side by a cooling ventilator. The lamp receptacle body around the lamp bulb is completely closed up to a small opening fitted with a condenser lens for the beam outlet. At the beam outlet window of the lamp housing there is a connecting piece, which leads the radiation outward. The air flow of the ventilator essentially cools or tempers the lamp receptacle body, but does not reach the short-wave radiation in the tubular beam outlet opening, so that no ozone can be generated there and also directly on the lamp bulb. However, because the spectrum of this lamp emitted outward from the beam outlet opening also comprises wavelengths less than 180 nm, ozone formation outside of the lamp module is not prevented.

A similar lamp design is also known from European patent application publication EP 1 201 984 A1. Here, however, in addition to the deuterium lamp, a halogen lamp is also provided, in order to have available a broadened wavelength spectrum for the spectral analysis. Such systems are also called UV-VIS modules, because the spectrum extends into the visible range (VIS=visible).

The deuterium lamp and halogen lamp are arranged one after the other on a common optical axis. The lamp receptacle body of the lamp bulb of the deuterium lamp has in the optical axis a beam inlet opening for the radiation of the halogen lamp arranged behind the deuterium lamp and a common beam outlet opening. Both lamp bulbs could also be housed in the same lamp receptacle body. The cooling by ventilator is here also arranged on the rear side of the lamp housing and does not act on the radiation emitted from the beam outlet opening. Because no ozone filter is provided—also in the lamp according to EP 1 186 828 A1—only the ozone formation within the lamp is suppressed, but not outside of the lamp.

BRIEF SUMMARY OF THE INVENTION

The invention is based on the object of providing a lamp module with a deuterium lamp having an ozone filter that exhibits a long service life, that can be manufactured economically, and that ensures a high intensity in the wavelength range of 190 nm to 250 nm.

Starting with a deuterium lamp of the generic type mentioned at the outset, this object is achieved according to the invention in that a VUV edge filter is provided in the beam outlet opening and on the side of the optical transmission element facing the deuterium lamp.

In the deuterium lamp according to the invention, a lamp bulb made of synthetic quartz glass is used that ensures excellent UV transmission even in the short-wave range up to approximately 150 nm. The VUV edge filter absorbs the short-wave UV radiation having wavelengths less than 190 nm, which otherwise could lead to ozone formation outside of the lamp module. A corresponding coating of the quartz glass lamp bulb with an ozone filter can therefore be eliminated. Thus, there are many possibilities for arranging the lamp bulb in the housing or lamp receptacle body of the lamp module. The quartz glass lamp bulb is thus a standard component that represents an economical component for the production of the lamp module. The abbreviation VUV stands for Vacuum Ultraviolet and designates the spectral range from approximately 100 nm up to approximately 190 nm.

Because the lamp bulb is surrounded by the lamp receptacle body and has a seal against the outside air, only a small air volume is enclosed between the quartz glass bulb and the housing interior. In this narrow, limited space, ozone formation due to the short-wave radiation emitted from the quartz-glass bulb is possible and leads very quickly to a saturated atmosphere there, which is hardly exposed to convection and therefore has no effect on the stability of the radiation emerging from the lamp module.

Of decisive importance is that, due to the VUV edge filter arranged in the beam outlet opening, ozone formation is prevented by sharp filtering out of the wavelength range less than 190 nm in the external environment of the lamp module. The filter therefore exhibits high transmission in the wavelength range above 190 nm, so that the spectrum usable for spectral-analysis purposes is nevertheless large enough for most applications for the lamp module according to the invention.

Due to the arrangement of the filter with a spacing from the surface of the quartz glass bulb, this is exposed to a low thermal load, which significantly increases its service life and thus also that of the entire lamp module.

The optical transmission element closing the beam outlet opening involves, for example, a condenser lens or a simple disk, which acts merely as an optical window.

In a preferred embodiment of the invention, the lamp bulb is inserted into the cavity of the lamp receptacle body while leaving a gap, whose gap width lies in a wavelength range of 0.5 mm to 5 mm.

In addition, it has proven advantageous if the optical transmission element is arranged in the beam outlet opening with a spacing from the lamp bulb of maximum 20 mm.

By this geometric design of the space around the lamp bulb and for the beam decoupling, the effects of the ozone formation in this volume are minimized. In this arrangement, a saturation of the ozone atmosphere is quickly reached, so that no time variable effects are produced on the emitted radiation. Any intensity losses due to ozone absorption in the range of 200 nm to 300 nm are minimized by a shortest possible optical path length within the saturated ozone atmosphere.

Moreover, an optimal cooling effect is produced when the coolable lamp receptacle body has a small spacing from the lamp bulb surface.

Further optimization with regard to a complete suppression of the ozone formation within the lamp receptacle body can be achieved if the gap is kept under a vacuum or is filled with an oxygen-free gas. Nitrogen or even noble gases are suitable as the oxygen-free gas.

Preferably, the lamp receptacle body is formed as a metallic cooling body. According to the operation of the lamp module, the lamp bulb quickly becomes very hot and must be cooled. If the lamp receptacle body is made of metal—for example as an aluminum component—the good heat conducting metal acts as a cooling body, so that additional ventilation or other cooling measures can be eliminated, which achieves an economical operation of the lamp module.

In a preferred embodiment, the edge filter is arranged in the beam outlet opening directly on the surface of the optical transmission element. This embodiment has the advantage that, in the optical system, the number of boundary faces through which the radiation must pass or at which radiation is absorbed is reduced relative to a separate edge filter and in comparison the portion of usable radiation is approximately 8% higher. In addition, such edge filters can be deposited on lenses or smooth windows by economical methods.

An alternative to the arrangement of the edge filter consists in arranging the filter in the beam outlet opening with a spacing from the surface of the optical transmission element. This arrangement has the advantage that the edge filter can be used as a stand-alone component and also can be replaced, if necessary. Filter plates of this type are robust and their assembly in the beam outlet opening is simple. They are provided, for example, as a plate made of absorbent filter glass or in the form of a plate made of synthetic quartz glass that is coated with the filter material. Because the separate filter component—in contrast to the lamp bulb—is hardly exposed to mechanical loads, it can be significantly thinner than the walls of the lamp bulb. Preferred thicknesses of the filter component lie in a range of 0.1 to 1 mm, especially preferred is a maximum of 0.3 mm. Due to the smaller thickness, the transmission for the desired optical radiation in the filter component is greater than for the lamp bulb.

Advantageously, the VUV edge filter is an absorption filter or an interference filter or a combination of these two filter types. Absorption filters consist of an absorbent material as, for example, a UV-absorbent glass. They are economical, but often exhibit a slightly steep absorption edge, which is dependent on the material and not changeable. Interference filters like those described, for example, in DE 39 021 44 A1 avoid these disadvantages. These filters consist of a coated base material, wherein the position of the absorption edge can be influenced by the thickness of the coating.

It has proven effective if the edge filter comprises a multi-layer material. In an edge filter made of a multi-layer material, the position and slope of the absorption edge can be better adapted and optimized to the actual requirements. In addition, with multiple layers the so-called "waviness" of the filter effect in the region of the transmission wavelength, which is to be traced back to interference effects, can be reduced. The absorption edge of the edge filter preferably lies in a range of 180 nm to 200 nm.

To reduce or to prevent the emission of ozone from the lamp housing, the beam outlet opening is preferably sealed against the outside. For minimal requirements on tightness, a fine thread between the condenser lens and the lamp housing can be sufficient.

With regard to broadening the wavelength range, an embodiment of the lamp module is especially preferred in which, in the cavity of the lamp receptacle body, a second spectral lamp is arranged, whose beam is guided through the lamp bulb of the deuterium lamp to the beam outlet opening. For spectral photometry it is advantageous if the wavelength range of the usable spectrum is as wide as possible. The use of a second spectral lamp having a different emission spectrum than the deuterium lamp acts counter to this requirement. Moreover, as the case may be, only one of the two spectral lamps could even be used, so that such a lamp module is more flexibly usable.

For the spectral photometer application, it has proven effective if the second spectral lamp is a halogen lamp or an LED (light-emitting diode). The wavelength range of the radiation typically used in halogen lamps lies in a range of 350 to 1100 nm. Thus, the combination with a deuterium lamp covers a wide spectrum of 190 nm to 1100 nm.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Example 1

Figure 1:
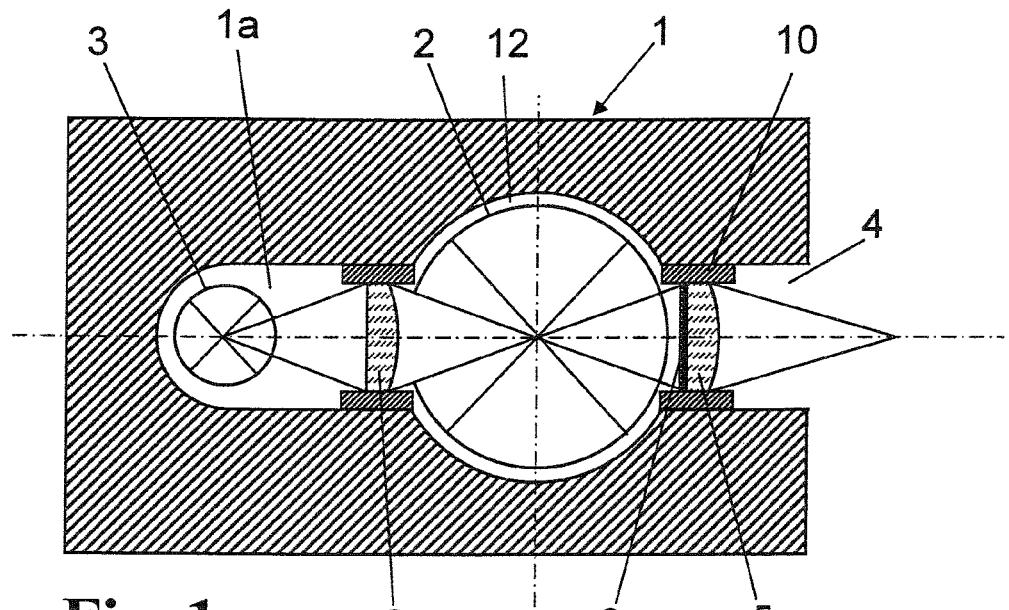
FIG. 1 is a schematic, side-sectional view of an embodiment of the lamp module according to the invention having a filter directly on the surface of the condenser lens.

The embodiment of the lamp module according to the invention shown in FIG. 1 in schematic representation has a lamp receptacle body 1 made of aluminum, which serves as a cooling body. The lamp receptacle body 1 has a cavity 1a, in which one or more spectral lamps can be inserted. In the actual case, a deuterium lamp having a quartz glass lamp bulb 2 and, on the same optical axis, a halogen lamp having the lamp bulb 3 are inserted in the cavity 1a of the lamp receptacle body 1.

The lamp bulb 2 of the deuterium lamp consists of synthetic quartz glass. To be able to optimally use the cooling effect of the lamp receptacle body 1 on the lamp bulb 2 inserted into its cavity 1a, the lamp bulb 2 is inserted into the lamp receptacle body 1 while leaving a small gap 12 between the receptacle body 1 and the lamp bulb 2. The gap width equals approximately 2 mm.

The gap volume is filled with air so that, in this small volume, ozone is formed by the radiation components having wavelengths <190 nm emitted from the lamp bulb 2. For very small volumes, however, the atmosphere is very soon saturated with ozone, which, however, has practically no influence on the quality of the radiation emitted from the lamp module.

If ozone formation is even to be prevented in this gap volume, the gap volume can be evacuated or filled or flushed with an oxygen-free gas as, for example, nitrogen or argon.

The lamp receptacle body 1 furthermore has, in the direction of the central optical axis, a connecting piece as the beam outlet opening 4. In this beam outlet opening 4, a planar-convex condenser lens 5 is fixed with a VUV edge filter 6 mounted on its side facing the lamp bulb 2. The condenser lens 5 and the VUV edge filter 6 form an integral component, which is arranged on the optical axis of the lamp module at a spacing of approximately 3 mm from the surface of the lamp bulb 2 of the deuterium lamp.

The fixing of the condenser lens 5 and filter 6 is realized such that the components are bonded all around in a sealed ring mounting 10 in the beam outlet opening 4. Thus, it is ensured that no air exchange can take place between the surroundings and the cavity 1a of the lamp receptacle body 1.

The VUV edge filter 6 is an interference filter having a multi-layer arrangement. By the direct arrangement of the filter 6 on the condenser lens 5, the number of boundary surfaces for the emitted radiation are minimized, which increases the portion of usable radiation by up to 8%, compared to an arrangement having a filter arranged separately from the condenser lens.

In an alternative embodiment, the edge filter 6 consists of a combination of an interference filter and absorption filter. Here, a layer system made of several interference layers is applied on a base component made of an absorbent material.

On the end of the lamp receptacle body 1 opposite the beam outlet opening 4 on the optical axis, as mentioned at the beginning, a halogen lamp having a lamp bulb 3 is arranged behind the deuterium lamp. The radiation emitted from the lamp bulb 3 of the halogen lamp passes through the lamp bulb 2 of the deuterium lamp, optionally focused by a lens 8 or a lens system. Thus, the wavelength ranges of the two spectral lamps expand to a wider spectrum, which is curtailed by the VUV edge filter 6 in the beam outlet opening 4 of the lamp module only by the wavelength range less than 190 nm.

Example 2

Figure 2:
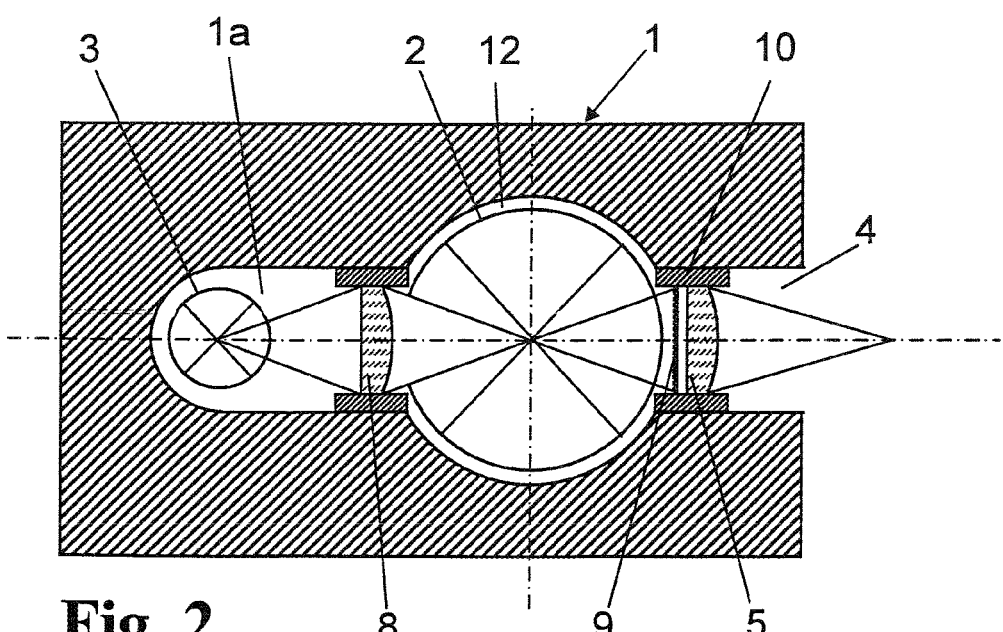
FIG. 2 is a schematic, side-sectional view similar to FIG. 1, but of another embodiment of the lamp module according to the invention having a filter set apart from the condenser lens.

The lamp module according to FIG. 2 consists essentially of the same arrangement as described in Example 1. However, here the VUV edge filter 9 is designed as a self-supporting filter plate, which is fixed in the beam outlet opening 4 with a spacing of 3 mm from the planar-convex condenser lens 5.

The filter plate 9 is mounted with a threaded ring 10, by which it is screwed into the beam outlet opening 4. In alternative embodiments, the filter plate is clamped or bonded in the beam outlet opening 4.

In this case, the filter plate 9 is made of synthetic quartz glass, which is coated with a layer made of the filter material. It can be easily mounted and removed, so that even a possible replacement by a different filter type or for repair reasons is easily possible. The fixing is formed so that no air exchange can take place between the environment and the cavity 1a of the lamp receptacle body 1. For this purpose, the filter plate 9 lies against a shoulder (not shown) via a sealing ring, wherein it is pressed outward against this shoulder by a spring ring from the inside of the lamp, with this spring ring being placed, in turn, in a groove in the beam outlet opening 4.

In this embodiment a sealed fixing of the condenser lens 5, which is inserted in the beam outlet opening 4 after the VUV edge filter 9 in the direction of the beam outlet, is eliminated, which simplifies its replacement, if necessary.

The edge filter is arranged on the optical axis of the lamp module with a spacing of 3 mm from the surface of the lamp bulb 2 of the deuterium lamp. This spacing should not be exceeded, because otherwise the expanded gap volume, which is in the beam outlet opening 4 up to the VUV edge filter 9 and is located between the lamp bulb 2 of the deuterium lamp and the cavity 12 of the lamp receptacle body 1, will become too large. Under these conditions, the ozone atmosphere produced there can infiltrate under the influence of convection, which could, in turn, negatively affect the stability of the emitted wavelength spectrum. In addition, the radiation intensity is negatively affected by absorption in the ozone-containing atmosphere.

The embodiment of the lamp module having a self-supporting VUV edge filter 9 is especially suitable for use as a radiation source for spectrometers in liquid chromatography (HPLC and UHPLC), in capillary electrophoresis, and in thin-film chromatography.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A lamp module comprising a lamp receptacle body (1) having a cavity (12) receiving a deuterium lamp (2) having a lamp bulb made of synthetic quartz glass, the cavity (12) having a beam outlet opening (4) closed with an optical transmission element (5), and a VUV edge filter (6; 9) located in the beam outlet opening (4) on a side of the optical transmission element (5) facing the deuterium lamp (2).

2. The lamp module according to claim 1, wherein the lamp bulb is positioned in the cavity (12) of the lamp receptacle body leaving a gap (2a), the gap having a width in a range of 0.5 mm to 5 mm.

3. The lamp module according to claim 2, wherein the gap (2a) is held under a vacuum or is filled with an oxygen-free gas.

4. The lamp module according to claim 1, wherein the optical transmission element (5) is arranged in the beam outlet opening (4) with a spacing from the lamp bulb of a maximum 20 mm.

5. The lamp module according to claim 1, wherein the lamp receptacle body (1) comprises a metallic cooling body.

6. The lamp module according to claim 1, wherein the VUV edge filter (6) is arranged directly on a surface of the optical transmission element (5) in the beam outlet opening (4).

7. The lamp module according to claim 1, wherein the VUV edge filter (9) is arranged in the beam outlet opening (4) with a spacing from a surface of the optical transmission element (5) facing the deuterium lamp (2).

8. The lamp module according to claim 7, wherein the VUV edge filter (9) has a thickness in a range of 0.1 to 1 mm.

9. The lamp module according to claim 8, wherein the VUV edge filter (9) has a maximum thickness 0.3 mm.

10. The lamp module according to claim 1, wherein the VUV edge filter (6; 9) is selected from an absorption filter, an interference filter, and a combination of these two filters.

11. The lamp module according to claim 1, wherein the VUV edge filter (6; 9) comprises a multi-layer material.

12. The lamp module according to claim 1, wherein the beam outlet opening (4) is sealed against the outside.

13. The lamp module according to claim 1, wherein the VUV edge filter (6; 9) has an absorption edge in a range of 180-200 nm.

14. The lamp module according to claim 1, further comprising a second spectral lamp (3) arranged in a cavity (1a) of the lamp receptacle body (1), the second spectral lamp (3) having a beam guided through the lamp bulb of the deuterium lamp (2) to the beam outlet opening (4).

15. The lamp module according to claim 14, wherein the second spectral lamp (3) is selected from a halogen lamp and a light-emitting diode.

16. A spectral analysis device comprising the lamp module according to claim 1.

* * * * *